United States Patent
Yamaguchi et al.

(10) Patent No.: US 8,557,899 B2
(45) Date of Patent: Oct. 15, 2013

(54) REINFORCED FLAME RETARDANT RESIN COMPOSITION AND MOLDED ARTICLE

(75) Inventors: Toru Yamaguchi, Tokyo (JP); Tomohiro Kondo, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/428,661

(22) Filed: Mar. 23, 2012

(65) Prior Publication Data

US 2012/0252945 A1 Oct. 4, 2012

(30) Foreign Application Priority Data

Mar. 29, 2011 (JP) ................................. 2011-071513

(51) Int. Cl.
*C08K 5/523* (2006.01)

(52) U.S. Cl.
USPC .......................................... 524/127; 524/449

(58) Field of Classification Search
USPC .......................................... 524/127, 437, 449
See application file for complete search history.

(56) References Cited

U.S. PATENT DOCUMENTS

| | | | | |
|---|---|---|---|---|
| 6,762,228 B2 * | 7/2004 | Seidel et al. | ................... | 524/127 |
| 7,572,847 B2 * | 8/2009 | Shibuya et al. | ................ | 524/156 |
| 7,893,141 B2 * | 2/2011 | Wit et al. | ........................ | 524/99 |
| 2002/0161078 A1 * | 10/2002 | Zobel et al. | ................... | 524/115 |
| 2012/0029122 A1 * | 2/2012 | Xue et al. | ...................... | 524/100 |

FOREIGN PATENT DOCUMENTS

| JP | 5-287185 | 11/1993 |
|---|---|---|
| JP | 6-207189 | 7/1994 |
| JP | 8-115588 | 5/1996 |
| JP | 8-183902 | 7/1996 |
| JP | 9-12733 | 1/1997 |
| JP | 2004-315645 | 11/2004 |

* cited by examiner

*Primary Examiner* — Peter Szekely
(74) *Attorney, Agent, or Firm* — Greenblum & Bernstein, P.L.C.

(57) ABSTRACT

A reinforced flame retardant resin composition including 20 to 87% by mass of an (A) thermoplastic resin, 3 to 20% by mass of a (B) aromatic phosphoric acid ester-based flame retardant agent, 5 to 40% by mass of (C) mica powder, and 0.5 to 30% by mass of (D) hydrous mineral powder having a dehydration starting temperature for crystallization water in a range of 400 to 600° C.

14 Claims, No Drawings

REINFORCED FLAME RETARDANT RESIN COMPOSITION AND MOLDED ARTICLE

CROSS-REFERENCE TO RELATED APPLICATIONS

The present application claims priority under 35 U.S.C. §119 of Japanese Application No. 2011-071513, filed on Mar. 29, 2011, the disclosure of which is expressly incorporated by reference herein in its entirety.

BACKGROUND OF THE INVENTION

1. Field of the Invention

The present invention relates to reinforced flame retardant resin compositions and molded articles.

2. Description of Related Art

In recent years, for resin materials used in devices having optical system units, such as laser beam printers, copiers, projectors, and the like, good flame retardance along with high rigidity and high dimensional accuracy are required. In order to impart rigidity and dimensional accuracy to a resin material, conventionally, an inorganic filler, such as glass fiber, mica, and the like is blended in the resin. While rigidity and dimensional accuracy is improved, however, flame retardance tends to significantly decline in proportion to the blended amount of the inorganic filler, thereby making it extremely difficult to obtain the desired flame retardant property. On the other hand, in order to improve flame retardance, a phosphorus-based flame retardant agent may be blended in the resin. As described above, flame retardance tends to significantly decrease in proportion to the blended amount of the inorganic filler, and in some cases, it may be extremely difficult to obtain any flame retardant property. Thus, in order to obtain a sufficient flame retardant effect, it is necessary to add a large amount of a phosphorus-based flame retardant agent. In such a case, however, the resulting resin material is more likely to lose heat resistance and to drip during combustion. For all of these reasons, it is extremely difficult to obtain a resin material having the desired high heat resistance and good flame retardancy, while maintaining high rigidity and high dimensional stability.

As resin materials for a molded chassis of an optical system unit, a number of proposals have been made to date. For example, as a resin composition suitable for a material for a chassis, a resin composition has been proposed in which a large amount of glass fiber and the like is filled in an aromatic polycarbonate resin of a specific molecular weight (see Related Art 1, for example). A resin composition has also been proposed in which a fiber having a non-circular cross-section and a plate-shaped inorganic filler are blended in an aromatic polycarbonate resin of a specific molecular weight (see Related Art 2, for example). Furthermore, a chassis fixing an optical writing unit molded from a resin composition has been disclosed (see Related Art 3, for example), wherein the resin composition contains an aromatic polycarbonate resin and mica having specific particle size and a thickness, and the resin composition exhibits high rigidity and low anisotropy (see Related Art 3, for example). Furthermore, chassis parts being formed from a polyphenylene ether resin, an inorganic filler in a scaly form, and a phosphorus-based flame retardant agent, have also been proposed, and are said to have excellent dimensional accuracy (see Related Art 4, for example). Furthermore, a resin composition for use in large thin-walled molded parts, such as electrical and electronic equipment components, has been disclosed, the resin composition having excellent impact resistance, dimensional precision, and fluidity, and being composed of a polyphenylene ether resin and a styrene-based resin having specific intrinsic viscosity, glass fiber, and a plate-like filler (see Related Art 5, for example). Resin compositions suitable for a molded chassis have also been disclosed, the resin compositions being composed of a thermoplastic resin, such as a polyphenylene ether-based resin and a polycarbonate-based resin, along with a certain amount of an organic phosphorus-based flame retardant agent and inorganic filler, such as talc, mica, and the like (see Related Art 6).

[Related Art 1] Japanese Patent Laid-open Publication No. H5-287185

[Related Art 2] Japanese Patent Laid-open Publication No. H6-207189

[Related Art 3] Japanese Patent Laid-open Publication No. H9-12733

[Related Art 4] Japanese Patent Laid-open Publication No. H8-115588

[Related Art 5] Japanese Patent Laid-open Publication No. H8-183902

[Related Art 6] Japanese Patent Laid-open Publication No. 2004-315645

It is hard to say, however, that the above-mentioned conventionally disclosed resin compositions and molded articles using the same fully satisfy all the requirements such as high heat resistance, high rigidity, high dimensional accuracy, and good flame retardant property. There is room for further improvement, especially as a resin composition used for chassis parts for optical system units. Thus, an object of the present invention is to provide a resin composition that has achieved a good balance of high heat resistance, high rigidity, high strength, high dimensional accuracy, and good flame retardancy.

SUMMARY OF THE INVENTION

To address the above circumstances, the present inventors have conducted intensive studies, and as a result, found that flame retardancy of a resin composition is remarkably improved by using a hydrous mineral powder having a specific dehydration starting temperature for crystallization water in combination with mica powder at a specific mass ratio in the resin composition containing a thermoplastic resin and an aromatic phosphoric acid ester-based flame retardant agent. The inventors have dramatically improved heat resistance and have prevented dripping during combustion.

Specifically, the present invention provides at least the following embodiments:

Reinforced flame retardant resin compositions comprising
20 to 87% by mass of an (A) thermoplastic resin,
3 to 20% by mass of a (B) aromatic phosphoric acid ester-based flame retardant agent,
5 to 40% by mass of (C) mica powder, and
0.5 to 30% by mass of (D) hydrous mineral powder having a dehydration starting temperature for crystallization water in a range of 400 to 600° C.

In some embodiments, the reinforced flame retardant resin compositions comprise
30 to 87% by mass of the (A) component,
3 to 20% by mass of the (B) component,
5 to 30% by mass of the (C) component, and
0.5 to 20% by mass of the (D) component, in which
a total amount of the (C) component and the (D) component is 10 to 50% by mass.

The reinforced flame retardant resin compositions may further include 0.01 to 2 parts by mass of an (E) fluorine-containing dripping preventing agent with respect to 100 parts by mass of a combination of the (A) component, the (B) component, the (C) component, and the (D) component.

The reinforced flame retardant resin compositions include embodiments, in which the (C) mica powder has an average particle diameter of 10 to 150 μm.

In some embodiments, the (D) hydrous mineral powder having a dehydration starting temperature for crystallization water in a range of 400 to 600° C. has an average particle diameter of 0.01 to 100 μm.

In some embodiments, the (D) hydrous mineral powder having a dehydration starting temperature for crystallization water in a range of 400 to 600° C. is a chlorite group mineral powder having a dehydration starting temperature for crystallization water in a range of 400 to 600° C. In some embodiments, the (D) hydrous mineral powder having a dehydration starting temperature for crystallization water in a range of 400 to 600° C. is chlorite, and in some embodiments, the (D) hydrous mineral powder having a dehydration starting temperature for crystallization water in a range of 400 to 600° C. is boehmite (hydrated alumina).

The (A) component may contain 50 to 100% by mass of an (A1) aromatic polycarbonate and 50 to 0% by mass of an (A2) styrene-based resin, and in some embodiments, the (A) component contains 50 to 100% by mass of an (A3) polyphenylene ether and 50 to 0% by mass of the (A2) styrene-based resin.

The present invention also provides molded articles molded from the reinforced flame retardant resin compositions as listed above.

In some embodiments, a molded chassis is molded from the reinforced flame retardant resin compositions listed above; and in some embodiments, the molded chassis is a molded chassis for a device having an optical system unit.

The present invention provides a reinforced flame retardant resin composition having well-balanced properties of high heat resistance, high rigidity, high strength, high dimensional accuracy, and good flame retardancy, which have been conventionally extremely difficult to achieve.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Unless otherwise stated, a reference to a compound or component includes the compound or component by itself, as well as in combination with other compounds or components, such as mixtures of compounds. It should be noted that the express inclusion of classes of compounds, or specific compounds within a class, in this specification, is intended as a disclosure and contemplation of the express exclusion of those same compounds or classes of compounds. This rule of express inclusion, contemplated exclusion, applies throughout this specification.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values within that range. For example, if a range is from about 1 to about 50, it is deemed to include, for example, 1, 7, 34, 46.1, 23.7, or any other value within the range.

Hereinafter, an embodiment (referred to as a "present embodiment," hereinafter) to carry out the present invention is described in detail. The present invention is not limited to the following embodiment and various modifications may be made within the scope of the present invention.

[Reinforced Flame Retardant Resin Composition]

A reinforced flame retardant resin composition of the present embodiment contains:

20 to 87% by mass of an (A) thermoplastic resin, 3 to 20% by mass of a (B) aromatic phosphoric acid ester-based flame retardant agent, 5 to 40% by mass of (C) mica powder, and 0.5 to 30% by mass of (D) hydrous mineral powder having a dehydration starting temperature for crystallization water within a range of 400 to 600° C.

((A) Thermoplastic Resin)

As the (A) thermoplastic resin (may be simply referred to as an (A) component), hereinafter) configuring the reinforced flame retardant resin composition of the present embodiment, examples include, but are not limited to: polyolefins such as polyethylene and polypropylene; styrene-based resins such as polystyrene; engineering plastics such as aromatic polycarbonate, polyphenylene ether, polyester, polysulfone, polyether sulfone, polyphenylene sulfide, polyetherimide, polyether ether ketone, polyarylate; and the like. Of the (A) thermoplastic resin, an (A1) aromatic polycarbonate, an (A2) styrene-based resin, and an (A3) polyphenylene ether are preferable from the viewpoint of imparting molding processability and desired flame retardancy. In particular, from the viewpoint of imparting flame retardancy and heat resistance, it is desirable to have a combination in which the content of the (A1) aromatic polycarbonate is preferably 50 to 100% by mass, more preferably 60 to 95% by mass, and even more preferably 70 to 90% by mass; and the content of the (A2) styrene-based resin is preferably 50 to 0% by mass, more preferably 40 to 5% by mass, and even more preferably 30 to 10% by mass, in 100% by mass of the (A) component. From the viewpoint of imparting flame retardancy and heat resistance, it is desirable to have a combination in which the content of the (A3) polyphenylene ether is preferably 50 to 100% by mass, more preferably 50 to 90% by mass, and even more preferably 55 to 80% by mass; and the content of the (A2) styrene-based resin is preferably 50 to 0% by mass, more preferably 50 to 10% by mass, and even more preferably 45 to 20% by mass.

<(A1) Aromatic Polycarbonate>

The (A1) aromatic polycarbonate (may be referred to as an (A1) component, hereinafter) is obtained by reacting a dihydric phenol with a carbonate precursor. Examples of the reaction method include, but are not limited to, interfacial polycondensation, melt transesterification, solid-phase transesterification of carbonate prepolymer, ring-opening polymerization of cyclic carbonate compound, and the like.

Examples of the dihydric phenol include, but are not limited to, hydroquinone, resorcinol, 4,4'-biphenol, 1,1-bis(4-hydroxyphenyl)ethane, 2,2-bis(4-hydroxyphenyl)propane (also known as bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene, 9,9-bis(4-hydroxy-3-methylphenyl)fluorine, and the like. A preferable dihydric phenol is bis(4-hydroxyphenyl)alkane. In particular, bisphenol A is more preferable from the viewpoint of impact resistance of the reinforced flame retardant resin composition.

Examples of the carbonate precursor include, but are not limited to, carbonyl halide, carbonate ester, haloformate, and more specifically, phosgene, dihaloformate of diphenyl carbonate or dihydric phenol, and the like.

In producing the (A1) aromatic polycarbonate by interfacial polymerization using the dihydric phenol and the carbonate precursor, a catalyst, a terminal capping agent, an antioxidant for preventing oxidation of dihydric phenols, and the like may be used as desired. In a polymerization reaction by the interfacial polymerization, a dihydric phenol and phosgene are generally reacted in the presence of an acid binding agent and an organic solvent. Examples of the acid binding agent include, but are not limited to, alkali metal hydroxides such as sodium hydroxide, potassium hydroxide, and the like; and amine compounds such as pyridine, and the like. Examples of the organic solvent include, but are not limited to, halogenated hydrocarbons such as methylene chloride, chlorobenzene, and the like. In addition, in order to promote the reaction, tertiary amines such as triethylamine, tetra-n-butylammonium bromide, and tetra-n-butylphosphonium bromide; a quaternary ammonium compound; a quaternary phosphonium compound; and the like may be used as a catalyst. It is preferable to keep a reaction temperature 0 to 40° C. in general, reaction time about 10 minutes to 5 hours, and pH of the solution during a reaction to be 9 or more. Further, a terminal capping agent is generally used in a polymerization reaction by interfacial polycondensation. As the terminal capping agent, monofunctional phenols may, for example, be used. As the monofunctional phenols, it is preferable to use phenol, p-tert-butylphenol, p-cumylphenol, and the like. Examples of the monofunctional phenols further include, but are not limited to, decyl phenol, dodecyl phenol, tetradecyl phenol, hexadecyl phenol, octadecyl phenol, eicosyl phenol, docosyl phenol, triacontyl phenol, and the like. One of the terminal capping agents may be used, or a mixture of two or more thereof may be used.

Furthermore, the (A1) aromatic polycarbonate may contain, for example, branched polycarbonate in which a polyfunctional aromatic compound having three or more functional groups is copolymerized; polyester carbonate in which a difunctional carboxylic acid of aromatic or aliphatic (including alicyclic) series is copolymerized; polycarbonate copolymer in which bifunctional alcohol (including alicyclic series) is copolymerized, and polyester carbonate in which bifunctional carboxylic acid and bifunctional alcohol are copolymerized together. In addition, the (A1) aromatic polycarbonate may be a mixture of two or more of the obtained polycarbonates. As the polyfunctional aromatic compound having three or more functional groups, for example, 1,1,1-tris(4-hydroxyphenyl)ethane, 1,1,1-tris(3,5-dimethyl-4-hydroxyphenyl)ethane, and the like may be used. When the (A1) aromatic polycarbonate includes a polyfunctional compound that generates a branched aromatic polycarbonate, a proportion of the polyfunctional aromatic compound in a total amount of the (A1) aromatic polycarbonate is preferably 0.001 to 1 mol %, more preferably 0.005 to 0.9 mol %, even more preferably 0.01 to 0.8 mol %.

It is preferable that aliphatic bifunctional carboxylic acid be an α,ω-dicarboxylic acid. As the aliphatic bifunctional carboxylic acid, preferable examples include straight-chain saturated aliphatic dicarboxylic acids such as sebacic acid (decanedioic acid), dodecanedioic acid, tetradecanedioic acid, octadecanedioic acid, icosanedioic aid, and the like; as well as aliphatic dicarboxylic acids such as cyclohexanedicarboxylic acid, and the like. As the aromatic bifunctional carboxylic acid, examples include terephthalic acid, isophthalic acid, and the like. As the bifunctional alcohol, alicyclic diol is preferable, and examples thereof include, but are not limited to, cyclohexane, dimethanol, cyclohexane diol, tricyclodecane dimethanol, and the like. In addition, as the (A1) aromatic polycarbonate, a polycarbonate-polyorganosiloxane copolymer in which a polyorganosiloxane unit is copolymerized may be used.

As the (A1) aromatic polycarbonate, one variety thereof may be used. Alternatively, a mixture of two or more varieties of aromatic polycarbonates may be used, the varieties of aromatic polycarbonates including, but are not limited to, aromatic polycarbonate having a different type of the above-mentioned dihydric phenol, aromatic polycarbonate containing a branched component, various types of polyester carbonate, a polycarbonate-polyorganosiloxane copolymer, and the like. In addition, a mixture of two or more types within each variety may be used, such as, for example, aromatic polycarbonates produced by different methods described below, and aromatic polycarbonates having different terminal capping agents.

Further, when the (A1) aromatic carbonate is produced by melt transesterification, there may be instances in which a branched structure is generated as a side reaction. In such instances, the amount of the branched structure in a total amount of the (A1) aromatic polycarbonate is preferably 0.001 to 1 mol %, more preferably 0.005 to 0.9 mol %, even more preferably 0.01 to 0.8 mol %. Furthermore, it is possible to calculate the content of the branched carbonate and the amount of the branched structure, by $^1$H-NMR measurement.

In the polymerization reaction of the (A1) aromatic polycarbonate, a reaction by the melt transesterification is usually a transesterification reaction between a dihydric phenol and a carbonate ester. The reaction is performed by a method in which a dihydric phenol and a carbonate ester are mixed while being heated in the presence of inert gas, and thereafter, a generated alcohol or phenol is distilled. A reaction temperature for the melt transesterification method is different depending on the boiling point of the generated alcohol or phenol, and the like, but generally is within the range of 120 to 350° C. In a late phase of the reaction, the reaction system may be depressurized to about $1.33 \times 10^3$ to $13.3 \times 10^3$ Pa so that generated alcohol or phenol is easily distilled. The reaction time is usually about 1 to 4 hours. Examples of the carbonate ester include, but are not limited to, esters having an aryl group having 6 to 10 carbons, which may have a substituent group, an aralkyl group, an alkyl group having 1 to 4 carbons, and the like. In particular, diphenyl carbonate is preferable. In addition, a polymerization catalyst may be used to accelerate the rate of polymerization performed by melt transesterification. Examples of the polymerization catalysts include, but are not limited to, alkali metal compounds such as sodium hydroxide, potassium hydroxide, sodium salt of dihydric phenol, and potassium salt; alkaline earth metal compounds such as calcium hydroxide, barium hydroxide, and magnesium hydroxide; and nitrogen-containing basic compounds such as tetramethylammonium hydroxide, tetraethylammonium hydroxide, trimethylamine, and triethylamine; and the like. Furthermore, catalysts used in a transesterification reaction, which is a general esterification reaction of alkoxides of alkali (earth) metal, organic acid salts of alkali (earth) metal, boron compounds, germanium compounds, antimony compounds, titanium compounds, zirconium compounds, and the like, may be used. One type of polymerization catalyst may be used, or alternatively, a combination of two or more types of the polymerization catalysts may be used. An amount of the polymerization catalysts used is selected within a range preferably of $1 \times 10^4$ to $1 \times 10^{-3}$ eq and more preferably of $1 \times 10^{-7}$ to $5 \times 10^{-4}$ eq, with respect to 1 mole of dihydric phenol in raw materials.

In the reaction by the melt transesterification in the polymerization reaction of the (A1) aromatic polycarbonate, in order to reduce the phenolic terminal group, compounds such as 2-chlorophenyl phenyl carbonate, 2-methoxycarbonylphenyl phenyl carbonate, 2-ethoxy carbonylphenyl phenyl carbonate, and the like may be added at the late phase of or after the end of polycondensation reaction. Reducing phenolic terminal groups helps to achieve improved stability of the polymer.

In addition, in the melt transesterification, it is preferable to use a devitalizing agent for neutralizing the activity of a catalyst. It is preferable that an amount of the devitalizing agent used be 0.5 to 50 mol with respect to 1 mole of the remaining catalysts. Further, it is preferable that the amount of the devitalizing agent used be 0.01 to 500 ppm, more preferably 0.01 to 300 ppm, even more preferably 0.01 to 100 ppm with respect to the aromatic polycarbonate after polymerization. Examples of preferable deactivating agents include, but are not limited to, phosphonium salts such as dodecylbenzenesulfonic acid tetrabutylphosphonium salt; ammonium salts such as tetraethylammonium dodecylbenzyl sulfate; and the like.

The (A1) aromatic polycarbonate has a viscosity average molecular weight preferably of 10000 or greater, and more preferably, 15000 to 50000. The lower limit of the viscosity average molecular weight is more preferably 16000, even more preferably 17000, and still more preferably 18000. On the other hand, the upper limit of the viscosity average molecular weight is more preferably 26000, even more preferably 25000, and still more preferably 23000.

As described above, the (A1) aromatic polycarbonate may be a mixture of two or more different types of aromatic polycarbonates. In this case, it is of course possible to mix aromatic polycarbonate having a viscosity average molecular weight outside the above ranges. For example, a mixture of aromatic polycarbonate having a viscosity average molecular weight exceeding 50000 has high entropic elasticity and is unlikely to produce a molded article with poor appearance caused by rheological behavior such as jetting. Thus, such a mixture is appropriate from the viewpoint of preventing poor appearance. In addition, such a mixture is advantageous in gas injection molding and the like, as it is more likely to stabilize the gas injection amount, to stabilize foam cells in foam molding, and to form fine and homogeneous cells. A mixture with aromatic polycarbonate having a viscosity average molecular weight of 80000 or more is more preferable, and a mixture with aromatic polycarbonate having a viscosity average molecular weight of 100000 or more is even more preferable. Specifically, a mixture may be preferably used when a molecular weight distribution having two or more peaks can be observed by a measurement method such as GPC (gel permeation chromatography) or the like.

Furthermore, in the (A1) aromatic polycarbonate, the amount of the phenolic hydroxyl group is preferably 30 eq/ton or less, more preferably 25 eq/ton or less, and even more preferably 20 eq/ton or less. It is also possible to make the amount of phenolic hydroxyl group substantially 0 eq/ton, for example, by sufficiently reacting a terminal capping agent. The amount of phenolic hydroxyl group can be obtained, for example, by performing a $^1$H-NMR measurement; by then calculating a molar ratio among a dihydric phenol unit having a carbonate bonding, a dihydric phenol unit having a phenolic hydroxyl group, and a unit of the terminal capping agent; and thereafter, based on the ratio, by converting into the amount of phenolic hydroxyl group per polymer weight.

The viscosity average molecular weight of the (A1) aromatic polycarbonate can be obtained by first obtaining the specific viscosity, which can be calculated by the following formula (I), from a solution prepared by dissolving 0.7 g of aromatic polycarbonate in 100 mL of methylene chloride at 20° C. using an Ostwald viscometer, and then by inputting the specific viscosity into the following formula (II) to obtain a viscosity average molecular weight M.

$$\text{specific viscosity } (\eta_{sp}) = (t - t_0)/t_0 \qquad (I)$$

[where $t_0$ represents the number of seconds for dropping of methylene chloride, and t represents the number of seconds for dropping of a sample solution]

A viscosity average molecular weight M is then obtained by inputting the obtained specific viscosity into the following formula.

$$\eta_{sp}/c = [\eta] + 0.45 \times [\eta]^2 c \text{ (where } [\eta] \text{ is limiting viscosity)} \qquad (II)$$

$[\eta] = 1.23 \times 10^{-4} M^{0.83}$ $C = 0.7$

As described above, the (A1) aromatic polycarbonate may be a mixture of two or more types of aromatic polycarbonates, the aromatic polycarbonates having different dihydric phenols, using or not using a terminal capping agent, having a straight- or branched-chain, being produced by different production methods, using different terminal capping agents, being a combination of aromatic polycarbonate and polyester carbonate, having different viscosity average molecular weights, and the like.

<(A2) Styrene-based Resin>

The (A2) styrene-based resin (may be referred to as an (A2) component or an (A2), hereinafter) is a synthetic resin obtained by polymerizing a styrene-based compound, or a styrene compound and a compound copolymerizable with the styrene-based compound, in the absence of a rubber polymer. The styrene-based compound is a compound represented by the following formula (1).

[Chemical formula (1)]

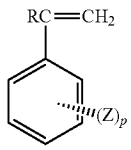

(1)

In the formula (1), R represents hydrogen, lower alkyl, or halogen; Z represents one or more types selected from the groups consisting of a vinyl group, hydrogen, halogen, and a lower alkyl group; and p represents an integer of 0 to 5.

Examples of the compound represented by the formula (1) include, but are not limited to, styrene, α-methylstyrene, 2,4-dimethylstyrene, monochlorostyrene, p-methylstyrene, p-tert-butylstyrene, ethylstyrene, and the like. Examples of the compound copolymerizable with the styrene-based compound include, but are not limited to, methacrylic acid esters such as methyl methacrylate and ethyl methacrylate; unsaturated nitrile compounds such as acrylonitrile and methacrylonitrile; acid anhydrides such as maleic anhydride; and the like. These compounds are used along with the styrene-based compounds.

Examples of the suitable (A2) styrene-based resin include polystyrene, an "MS" copolymer, an "AS" copolymer, an "MAS" copolymer, an "SMA" copolymer, and the like. As referred to herein, an MS copolymer is a copolymer primarily including methyl methacrylate and styrene. An AS copolymer is a copolymer mainly including acrylonitrile and styrene. An MAS copolymer is a copolymer mainly including methyl methacrylate, acrylonitrile, and styrene. An SMA copolymer is a copolymer mainly including styrene and maleic anhydride (MA).

The (A2) styrene-based resin may be those having a high stereoregularity, such as a syndiotactic polystyrene and the like, obtained, for example, by using a catalyst such as a metallocene catalyst and the like at the time of production. Also, in some cases, the (A2) styrene-based resin may be a polymer or a copolymer having a narrow molecular weight distribution, a block copolymer, and a polymer or a copolymer having high stereoregularity, those of which are obtained by methods such as anionic living polymerization, radical living polymerization, and the like. Furthermore, as the (A2) styrene-based resin, various copolymers that are precisely controlled at the molecular level may be used, the various copolymers being, for example, polymers having a controlled comb-like structure using a macromonomer. Furthermore, the (A2) styrene-based resin without rubber reinforcement is particularly suitable from the viewpoint of imparting flame retardancy and improved rigidity to the reinforced flame retardant resin composition and the molding article thereof of the present invention.

Of the examples described above, the AS copolymer and the polystyrene are particularly suitable as the (A2) styrene-based resin. As the (A2) component used in combination with the (A1) component described above, the AS copolymer is particularly suitable. As the (A2) component used in combination with the (A3) component described below, the polystyrene is particularly suitable. The AS copolymer may be a thermoplastic copolymer obtained by copolymerizing a vinyl cyanide compound mainly including acrylonitrile with an aromatic vinyl compound mainly including styrene.

A proportion of the vinyl cyanide compound in 100% by mass of an AS copolymer is preferably 5 to 50% by mass, more preferably 8 to 35% by mass, even more preferably 10 to 30% by mass. Further, a proportion of the aromatic vinyl compound in 100% by mass of an AS copolymer is preferably 95 to 50% by mass, more preferably 92 to 65% by mass, and even more preferably 90 to 70% by mass. Furthermore, an AS copolymer may include the vinyl cyanide compound or the aromatic vinyl compound copolymerized with another copolymerizable vinyl-based compound described above. A proportion of the other copolymerizable vinyl-based compound contained in the AS copolymer is preferably 15% by mass or less. Furthermore, an initiator, including those conventionally known, a chain transfer agent, and the like, may be used in a polymerization reaction as desired.

AS copolymers may be produced in any methods including, for example, bulk polymerization, solution polymerization, suspension polymerization, and emulsion polymerization. Of the methods, bulk polymerization or suspension polymerization is preferable. Further, the copolymerization method may be one stage copolymerization or multistage copolymerization. A weight average molecular weight of the AS copolymer is preferably 40000 to 200000 in terms of standard polystyrene by GPC measurement. The lower limit of the weight average molecular weight of the AS copolymer is more preferably 50000 and even more preferably 70000. The upper limit thereof is more preferably 160000 and even more preferably 150000. Further, even when the AS copolymer is contained as the (A2) styrene-based resin, the (A2) styrene-based resin may also contain a small amount of other styrene-based resins. In such a case, the content of the other styrene-based resins except the AS copolymer in 100% by mass of the (A2) styrene-based resin is preferably 10% by mass or less, more preferably 5% by mass or less than, and even more preferably 3% by mass or less.

<(A3) Polyphenylene Ether>

The (A3) polyphenylene ether (may be referred as an (A3) component or an (A3), hereinafter) has a repeating unit represented by the following formula (2) and/or formula (3). It is preferable that the (A3) polyphenylene ether be a homopolymer or a copolymer having a structural unit represented by the following formula (2) or formula (3).

[Chemical formula 2]

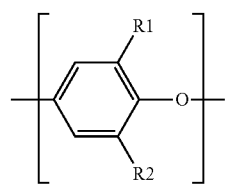

(2)

[Chemical formula 3]

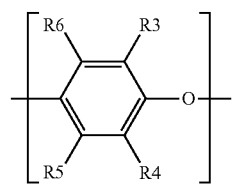

(3)

In the formulas (2) and (3), it is preferable that R1, R2, R3, R4, R5, and R6 each independently be a monovalent residue of an alkyl group having 1 to 4 carbons, an aryl group having 6 to 12 carbons, halogen, hydrogen, or the like. In such cases, however, a case in which both R5 and R6 are hydrogen is excluded. In addition, the number of carbons of the alkyl group is more preferably 1 to 3, the number of carbons of the aryl group is more preferably 6 to 8, and the monovalent residue is more preferably hydrogen. The number of repeating units in the above formulas (2) and (3) may vary, for example, according to the molecular weight distribution of the (A3) polyphenylene ether, and is thus not particularly limited.

Examples of the homopolymer of the (A3) polyphenylene ether include, but are not limited to, poly(2,6-dimethyl-1,4-phenylene)ether, poly(2-methyl-6-ethyl-1,4-phenylene) ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene) ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, poly(2-methyl-6-chloroethyl-1,4-phenylene)ether, and the like. In particular, poly(2,6-diethyl-1,4-phenylene)ether is preferable from the viewpoint of ease of obtaining and processing raw materials.

Examples of the copolymer of the (A3) polyphenylene ether include, but are not limited to, copolymers mainly composed of a polyphenylene ether structure, such as a copolymer of 2,6-dimethyl phenol and 2,3,6-trimethylphenol, a copolymer of 2,6-dimethyl phenol and o-cresol, and a copolymer of 2,3,6-trimethylphenol and o-cresol. In particular, the copolymer of 2,6-dimethyl phenol and 2,3,6-trimethylphenol is preferable from the viewpoint of workability and ease of obtaining raw materials. Further, a copolymer of 90 to 70% by mass of 2,6-dimethyl phenol and 10 to 30% by mass of 2,3,6-trimethylphenol is more preferable from the viewpoint of improvement of physical properties.

In addition, the (A3) polyphenylene ether may also include various other phenylene ether units as a partial structure within the scope of desired effects of the present embodiments. Examples of such phenylene ether units include, but are not limited to, a 2-(dialkylaminomethyl)-6-methylphenylene ether unit and a 2-(N-alkyl-N-phenylaminomethyl)-6-methylphenylene ether unit described in Japanese Patent Laid-open Publication Nos. H01-297428 and S63-301222. Further, the (A3) component may be bonded with a small amount of diphenoquinone or the like in the main chain of polyphenylene ether. Furthermore, in the (A3) component, a portion or all of the polyphenylene ether may be functionalized polyphenylene ether by reacting (denaturalizing) an acyl functional group with a functionalizing agent having one or more types selected from a group including carboxylic acid, acid anhydride, acid amide, imide, amine, ortho ester, hydroxy, and carboxylic acid ammonium salt. A reduced viscosity of the (A3) polyphenylene ether is preferably in the range of 0.25 to 0.55 dl/g, more preferably of 0.25 to 0.50 dl/g, and even more preferably of 0.25 to 0.43 dl/g. The reduced viscosity of the component (A3) is preferably 0.25 dl/g or more from the viewpoint of obtaining sufficient mechanical properties in the reinforced flame retardant resin composition of the present embodiment. The reduced viscosity of the (A3) component is preferably 0.55 dl/g or less from the viewpoint of molding processability. The reduced viscosity is obtained by performing a measurement at 30° C. using a chloroform solvent.

((B) Aromatic Phosphoric Acid Ester-Based Flame Retardant Agent)

The reinforced flame retardant resin composition of the present embodiment contains a (B) aromatic phosphoric acid ester-based flame retardant agent. Adding the (B) aromatic phosphoric acid ester-based flame retardant agent can help improve flexural modulus of the reinforced flame retardant resin composition of the present embodiment, and achieve lower specific gravity thereof as compared with a halogen-based flame retardant and the like. Furthermore, because the (B) aromatic phosphoric acid ester-based flame retardant agent has a plasticizing effect, melt viscosity of the reinforced flame retardant resin composition can be lowered, which makes it possible to reduce attrition on a mold surface during molding. It is preferable that the temperature at 5% mass loss determined by TGA (Thermo Gravimetry Analyzer) for the (B) component be 280° C. or more when a temperature is raised to 600° C. at a heating rate of 20° C./minute to 23° C./minute in a nitrogen gas atmosphere. The mass loss temperature is preferably 320° C. or more, more preferably 330° C. or more, and even more preferably 340° C. or more. The upper limit of the mass loss temperature of 380° C. or below is appropriate and is generally available. The upper limit of the mass loss temperature of 370° C. or below is more desirable. As described above, the (B) aromatic phosphoric acid ester-based flame retardant agent having relatively high mass loss temperature provides excellent flame retardancy in conjunction with a decrease in melt viscosity of the reinforced flame retardant resin composition. In addition, the (B) aromatic phosphoric acid ester-based flame retardant agent is also effective in improving melt fluidity without decreasing heat resistance. In consideration of the effect provided by blending the (B) aromatic phosphoric acid ester-based flame retardant agent, phosphoric acid ester oligomer mainly including resorcinol bis(dixylenylphosphate), phosphoric acid ester oligomer mainly including 4,4-dihydroxydiphenyl-bis(dixylenylphosphate), and phosphoric acid ester oligomer mainly including bisphenol A bis(diphenyl phosphate) are particularly preferable among the (B) aromatic phosphoric acid ester-based flame retardant agent. Herein, "mainly including" means that a small amount of other components having different degrees of polymerization may be contained. Furthermore, from the same point of view, phosphazene polymers represented by phenoxy phosphazene oligomer and cyclic phenoxy phosphazene oligomer can also suitably be used.

((C) Mica Powder)

The reinforced flame retardant resin composition of the present embodiment contains (C) mica powder (may be referred to as a (C) component, hereinafter) as an inorganic filler. An average particle diameter of the mica powder to be used as the (C) component is a center particle diameter D50% of the particle size distribution obtained by a laser light diffraction measurement method. The average particle diameter of the (C) mica powder is preferably 10 to 200 μm, more preferably 10 to 150 μm, and even more preferably 20 to 100 μm. The average particle diameter is preferably 10 μm or more from the viewpoint of imparting desirable heat resistance and rigidity, and is preferably 200 μm or less from the viewpoint of retaining good appearance of a molded article. The thickness of the (C) mica powder is preferably 0.01 to 10 μm. The thickness of the (C) mica powder can be measured by observing, with an electron microscope, a cross-section of the reinforced flame retardant resin composition. It is preferable that the (C) mica powder be muscovite mica having a Mohs hardness scale of about 3. The muscovite mica can generally achieve higher rigidity and higher strength as compared with other types of mica, such as phlogopite mica. The (C) mica powder can be obtained by grinding mica ore. Examples of methods of grinding mica include, for example, dry grinding and wet grinding. In dry grinding, raw mica ore is ground by a dry grinding machine. In wet grinding, mica ore is generally first coarsely ground by a dry grinding machine, is then provided with a grinding aid such as water, so as to be in a slurry state, and is thereafter ground by a wet grinding machine. Thereafter, the ground mica can be dehydrated and dried. The wet grinding is particularly effective in grinding and making mica finer and thinner. The (C) mica powder may be prepared using any methods so to be used for the reinforced flame retardant resin composition of the present embodiment. In addition, by sufficiently performing a magnetic sorting process (sorting with a magnetic sorting machine having a magnetic force of 1000 mT or more, for example) to reduce the content of iron-containing impurities, it is also possible to obtain mica powder having a good property using any of the grinding methods. A surface of the (C) mica powder may be treated with a surface treatment agent such as silane coupling agent. Further, it is also possible to use granulated mica power granulated with a convergence agent, such as a urethane-based or epoxy-based resin.

((D) Hydrous Mineral Powder having Dehydration Starting Temperature for crystallization water in Range of 400 to 600° C.)

The reinforced flame retardant resin composition of the present embodiment contains, as an inorganic filler, along with the (C) mica powder, (D) hydrous mineral powder (may be referred to as a (D) hydrous mineral powder or (D) component, hereinafter) having a dehydration starting temperature for crystallization water in a range of 400 to 600° C. Blending a certain type of hydrous mineral powder as the (D) component along with the (C) mica powder imparts excellent flame retardancy to the reinforced flame retardant resin composition of the present embodiments. The (D) hydrous mineral powder is hydrous mineral having crystallization water in the crystalline structure and having a dehydration starting temperature for the crystallization water in the range of 400 to 600° C. The dehydration starting temperature for crystallization water of the (D) component is selected from a range of 400 to 600° C., preferably of 400 to 550° C., and more preferably of 450 to 550° C. From the viewpoint of imparting desired flame retardancy, the dehydration starting temperature of the (D) component should be in the range of 400 to 600° C. The (D) component is not particularly limited as long as the dehydration starting temperature for crystallization water of the hydrous mineral powder is in the range of 400 to 600° C. Examples of the preferable hydrous mineral powder include chlorite group mineral powders and boehmite (hydrated alumina) having a dehydration starting temperature for crystallization in a range of 400 to 600° C. The chlorite group mineral powders are more preferable from the viewpoint of ease of obtaining and handling. A dehydration starting temperature for crystallization water may be obtained by performing a measurement using TG-DTA (Thermogravimetric/Differential Thermal Analyzer) in a nitrogen atmosphere while heating from a room temperature up to 800° C. When the dehydration starting temperature of the crystallization water is less than 400° C., the crystallization water may disperse due to advanced resolution in the extruding and/or molding processes. In such instances, the desired flame retardant effect may not be obtained. On the other hand, when the dehydration starting temperature of the crystallization water is above 600° C., dehydration of crystallization water may not sufficiently occur when combustion takes place. Thus, it is also difficult to impart the desired flame retardancy.

The chlorite group minerals are minerals containing an oxide selected from each group of oxides of Mg, Fe, Mn, Ni, and the like, oxides of Al, Fe, Cr, Ti, and the like, and oxides of Si, Al, and the like. The crystalline structure of the chlorite group minerals includes monoclinic systems and orthorhombic systems. Examples of the chlorite group minerals having the dehydration starting temperature for crystallization water in the range of 400 to 600° C. include chlorite, cookeite, pennantite, and the like. One type thereof may be used independently, or alternatively, two or more types thereof may be used at a time. Of the examples above, chlorite is particularly preferable from the viewpoint of availability and imparting the desired effect in flame retardancy. The (D) component can be obtained by grinding ore. The grinding method is not particularly limited, and axial flow milling, annular milling, roll milling, ball milling, jet milling, and container revolving compression shear milling may be used. The chlorite group mineral may be classified by a variety of classifiers after grinding. It is preferable to use a chlorite group mineral having a uniform particle size distribution.

The classifier is not particularly limited. Examples of classifiers include, but are not limited to, an impactor type inertia force classifier (such as variable impactor), a coanda effect utilizing type inertia force classifier (such as elbow jet), and a centrifugal classifier (such as multi-stage cyclone, MICROPLEX, dispersion separator, ACUCUT, turbo classifier, TURBOPLEX, MICRON SEPARATOR, and SUPER SEPARATOR).

The average particle diameter of the (D) hydrous mineral powder is a center particle size D 50% of the particle size distribution obtained by a laser light diffraction measurement method. The average particle diameter of the (D) hydrous mineral powder is preferably 0.01 to 100 µm, more preferably 0.05 to 80 µm, and even more preferably 0.1 to 50 p.m. It is preferable that the average particle diameter be 0.01 µm or more from the viewpoint of imparting desirable heat resistance and rigidity. It is further preferable that the average particle diameter be 100 µm or less from the viewpoint of imparting desirable flame retardancy. In addition, it is preferable that the (D) hydrous mineral powder be in an aggregation state from the viewpoint of handling. Examples of the powder preparation methods for the chlorite group minerals in the aggregation state include methods of deaeration compression, methods of pressure bonding using a sizing agent, and the like. In particular, the method of deaeration compression is preferable because of its simplicity and because it is possible to prevent an unnecessary sizing agent from contaminating the reinforced flame retardant resin composition of the present embodiments.

((E) Fluorine-containing Dripping Preventing Agent)

The reinforced flame retardant resin composition of the present embodiment may contain an (E) fluorine-containing dripping preventing agent (may be referred to as an (E) component, hereinafter). As the (E) fluorine-containing dripping preventing agent, a fluorine-containing polymer capable of forming a fibril may be used. Examples of such a fluorine-containing polymer include polytetrafluoroethylene, tetrafluoroethylene-based copolymer (tetrafluoroethylene/hexafluoropropylene copolymer, for example), a partially fluorinated polymer, and the like, as described in U.S. Pat. No. 4,379,910, a polycarbonate resin produced from fluorinated diphenol, and the like. In particular, polytetrafluoroethylene (may be referred to as PTFE, hereinafter) is preferable. The PTFE having a fibril-forming ability has extremely high molecular weight. The PTFE tends to bind to itself due to an external influence such as shear force and thus to become fibrous. The PTFE having a fibril-forming ability has a number average molecular weight preferably of 1 million to 10 million and more preferably of 2 million to 9 million, the number average molecular weight being obtained from a standard specific gravity. The PTFE may be used in an aqueous dispersion state in addition to a solid state. Further, the PTFE having a fibril-forming ability may be used as a mixture with other resins in order to improve dispersibility, to obtain even better flame retardancy, and to obtain higher mechanical strength of the reinforced flame retardant resin composition of the present embodiment. Examples of commercially available products of the PTFE having a fibril-forming ability include, but are not limited to, TEFLON (registered trademark) 6J of DuPont-Mitsui Fluorochemicals Co. Ltd., POLYFLON MPA FA500 and F-201L of Daikin Chemical Industry Co., Ltd, and the like. Examples of commercially available aqueous dispersion of the PTFE include, but are not limited to, FLUON AD-1 and AD-936 manufactured by Asahi ICI Fluoropolymers Co., Ltd., FLUON D-1 and D-2 manufactured by Daikin Industries Co., Ltd., TEFLON (registered trademark) 30J manufactured by DuPont-Mitsui Fluorochemicals Co. Ltd., and the like. Examples of methods to obtain the PTFE in a form mixed with other resins include, but are not limited to: (1) a method that mixes the PTFE aqueous dispersion with aqueous dispersion or solution of an organic polymer, performs co-precipitation, and obtains coaggregation mixture; (2) a method that mixes the PTFE aqueous dispersion with dried organic polymer particles; (3) a method that uniformly mixes the PTFE aqueous dispersion with organic polymer particles and then removes each medium from the mixture at the same time; (4) a method that polymerizes a monomer forming an organic polymer in the PTFE aqueous dispersion; and (5) a method that uniformly mixes the PTFE aqueous dispersion with organic polymer particles, thereafter, polymerizes a vinyl monomer in the mixed dispersion, and obtains a mixture. Examples of commercially available products of the PTFE in a form mixed with other resins include, for example, "METABLEN A3000" (product name) of Mitsubishi Rayon Co., Ltd., "BLENDEX B449" (product name) manufactured by GE Specialty Chemicals, and the like. A proportion of the PTFE in the form mixed with other resins in 100% by mass of the PTFE mixture is preferably 1 to 60% by mass and more preferably 5 to 55% by mass. When the proportion of the PTFE is within this range, it is possible for the PTFE to obtain good dispersibility. In addition, when the reinforced flame retardant resin composition of the present embodiment contains the (E) fluorine-containing dripping preventing agent, a proportion of the (E) component is identified by a content of a fluorine-containing polymer such as the PTFE and the like, without including other components.

(Mass ratio of the (A), (B), (C), (D), and (E) Components in the Reinforced Flame Retardant Resin Composition)

The reinforced flame retardant resin composition of the present embodiment contains the above-described (A) component, (B) component, (C) component, and (D) component as required components at a specific mass ratio. Such a mass ratio is described next. Given that a total amount of the (A) component, the (B) component, the (C) component, and the (D) component is 100% by mass, the reinforced flame retardant resin composition of the present embodiment contains 20 to 87% by mass of the (A) component, 3 to 20% by mass of the (B) component, 5 to 40% by mass of the (C) component, and 0.5 to 30% by mass of the (D) component. Given that a total amount of the (A) component, the (B) component, the (C) component, and the (D) component is 100% by mass, the content of the (A) component is selected from a range of 20 to 87% by mass, preferably of 30 to 87% by mass, more preferably of 30 to 80% by mass, and even more preferably of 45 to 75% by mass. It is preferable that the content of the (A) component be 20% by mass or more from the viewpoint of desirable molding processability and mechanical property retention, and be 87% by mass or less from the viewpoint of rigidity and dimensional accuracy. Given that a total amount of the (A) component, the (B) component, the (C) component, and the (D) component is 100% by mass, the content of the (B) component is selected from a range of 3 to 20% by mass, preferably of 4 to 15% by mass, and more preferably of 5 to 10% by mass. It is preferable that the content of the (B) component be 3% by mass or more from the viewpoint of imparting desirable flame retardancy, and be 20% by mass or less from the viewpoint of heat resistance, and dripping prevention during combustion. Given that a total amount of the (A) component, the (B) component, the (C) component, and the (D) component is 100% by mass, a content of the (C) component is selected from a range of 5 to 40% by mass, preferably of 5 to 30% by mass, more preferably of 10 to 25% by mass, and even more preferably of 10 to 20% by mass. It is preferable that the content of the (C) component be 5% by mass or more from the viewpoint of desirable rigidity and dimensional accuracy improvement, and be 40% by mass or less from the viewpoint of molding processability and mechanical property retention. Given that a total amount of the (A) component, the (B) component, the (C) component, and the (D) component is 100% by mass, the content of the (D) component is selected from a range of 0.5 to 30% by mass, preferably of 0.5 to 20% by mass, more preferably of 1 to 15% by mass, and even more preferably of 5 to 15% by mass. It is preferable that the content of the (D) component be 0.5% by mass or more from the viewpoint of imparting desirable flame retardancy, and be 20% by mass or less from the viewpoint of molding processability and mechanical property retention. In particular, a preferable form of the reinforced flame retardant resin composition includes 30 to 87% by mass of the (A) component, 3 to 20% by mass of the (B) component, 5 to 30% by mass of the (C) component, 0.5 to 20% by mass of the (D) component, while a total amount of the (C) component and the (D) component being 10 to 50% by mass. Thereby, it is possible to achieve a good balance among high heat resistance, high rigidity, high strength, high dimensional accuracy, and good flame retardancy.

The reinforced flame retardant resin composition of the present embodiment contains the (E) fluorine-containing dripping preventing agent preferably of 0.01 to 2 parts by mass, more preferably of 0.1 to 1 part by mass, and even more preferably of 0.15 to 0.8 part by mass with respect to 100 parts by mass of the combination of the (A) component, the (B) component, the (C) component, and the (D) component. Blending the (E) component enables achieving good flame retardant capabilities (e.g., drip prevention capability during combustion) without compromising other properties.

(Other Components)

The reinforced flame retardant resin composition of the present embodiment may contain a small amount of inorganic fillers other than the (D) component and the (C) component described above, within a range that does not impair the object of the present invention. Examples of such inorganic fillers include: glass-based fillers (having a Mohs hardness of about 6.5), such as a glass fiber and a glass flake; fillers having high hardness, such as aluminum borate whisker (having a Mohs hardness of about 7) and titanium oxide (being a rutile type and having a Mohs hardness of about 7). The content of the inorganic filler is preferably 5 parts by mass or less and more preferably 3 parts by mass or less with respect to 100 parts by mass of the combination of the (A) component, the (B) component, the (C) component, and the (D) component.

The reinforced flame retardant resin composition of the present embodiment may further contain a small amount of rubber polymers. A proportion of the rubber polymer is preferably 3 parts by mass or less and more preferably 1.5 parts by mass or less with respect to 100 parts by mass of the combination of the (A) component, the (B) component, the (C)

component, and the (D) component. The rubber polymer is a polymer consisting of a rubber component having a glass transition temperature of 10° C. or less, preferably of −10° C. or less, and more preferably of −30° C. or less, as well as a copolymer composed of the polymer consisting of the rubber component bonded by other polymer chains. Such a copolymer bonded by other polymer chains is more suitable as the rubber polymer. Examples of polymers consisting of the rubber component include: polybutadiene, polyisoprene, diene-based copolymers (such as a styrene-butadiene random copolymer and a styrene-butadiene block copolymer, an acrylonitrile-butadiene copolymer, and an acrylic butadiene rubber (a copolymer of acrylic acid alkyl ester or methacrylic acid alkyl ester and butadiene)), copolymers of ethylene and α-olefin (such as an ethylene-propylene random copolymer, an ethylene-propylene block copolymer, an ethylene-butene random copolymer, and an ethylene-butene block copolymer); copolymers of ethylene and unsaturated carboxylic acid ester (such as an ethylene-methacrylate copolymer and an ethylene-butyl acrylate copolymer); copolymers of ethylene and aliphatic vinyl (such as an ethylene-vinyl acetate copolymer), and ethylene-propylene non-conjugated diene terpolymers (such as an ethylene-propylene-hexadiene copolymer); acrylic rubbers (such as polybutyl acrylate, poly (2-ethylhexyl acrylate), and a copolymer of butyl acrylate and 2-ethylhexyl acrylate); and silicone-based rubbers (such as a polyorganosiloxane rubber, an IPN rubber consisting of a polyorganosiloxane rubber component and a polyalkyl(meth) acrylate rubber component, that is, a rubber having a structure in which the two rubber components are mutually mingled so as not to be separated, and an IPN rubber consisting of a polyorganosiloxane rubber component and a polyisobutylene rubber component). The monomer compound constituting the polymer chain bonded to the polymer consisting of the rubber component are the same as the various compounds described above as the examples for the (A2) styrene-based resin. Of the various compounds, an aromatic vinyl compound, a vinyl cyanide compound, a (meth)acrylic acid ester compound, and a (meth)acrylic acid compound are particularly suitable. In the copolymer bonded by the other polymer chains, a content of the polymer consisting of the rubber component is preferably 50% by mass or more, more preferably 60% by mass or more, and even more preferably 65% by mass or more in 100% by mass of the copolymer. Further, in 100% by mass of the copolymer bonded by the other polymer chains, a content of the polymer consisting of the rubber component is preferably 90% by mass or less, more preferably 85% by mass or less, and even more preferably 80% by mass or less.

In the rubber polymer, the other polymer chains constituting the copolymer may typically have a structure of a block copolymer and a graft copolymer. In particular, it is preferable to have the structure of the graft copolymer. Of the graft copolymers, a core-shell type graft copolymer, in which the other polymer chains are bonded to a core of the polymer consisting of a rubber component, is preferable. The graft copolymer may be manufactured, for example, in a graft reaction by one stage reaction or a graft reaction by multistage reactions of two stages or more. When the (A1) aromatic polycarbonate is a graft copolymer, a proportion of the polymer chains grafted to the polymer consisting of a rubber component (proportion of the mass of the graft polymer chains with respect to the mass of the rubber component), that is, a graft ratio (% by mass), is preferably 11 to 100% by mass, more preferably 17 to 66% by mass, and even more preferably 25 to 53% by mass. When a main component of the above-described (A) thermoplastic resin is the aromatic polycarbonate ((A1) component), it is preferable that the rubber polymer be a copolymer containing an aromatic vinyl compound or a (meth) acrylic acid ester compound as a monomer component thereof. In particular, it is preferable that the rubber polymer be a graft copolymer containing an aromatic vinyl compound or a (meth) acrylic acid ester compound as a monomer component of a graft chain thereof. When a main component of the (A) component is polyphenylene ether ((A3) component), it is preferable that the rubber polymer is a copolymer containing an aromatic vinyl compound as a required monomer component thereof. Herein, a "main component" means that a content of the component is more than 50% by mass.

Examples of the rubber polymer include: an SB (styrene-butadiene)polymer, an ABS (acrylonitrile-butadiene-styrene) polymer, an MBS (methyl methacrylate-butadiene-styrene) polymer, an MABS (methyl methacrylate-acrylonitrile-butadiene-styrene)polymer, an MB (methyl methacrylate-butadiene)polymer, an ASA (acrylonitrile-styrene-acrylic rubber) polymer, an AES (acrylonitrile-ethylene propylene rubber-styrene)polymer, an MA (methyl methacrylate-acrylic rubber) polymer, an MAS (methyl methacrylate-acrylic rubber-styrene) polymer, a methyl methacrylate-acryl-butadiene rubber copolymer, a methyl methacrylate-acryl-butadiene-styrene copolymer, and a methyl methacrylate-(acryl-silicone IPN rubber) polymer, and the like. It is preferable that these polymers be core-shell type graft copolymers in which a polymer chain composed of the above monomer (an aromatic vinyl compound, a vinyl cyanide compound, a (meth) acrylic acid ester compound, a (meth)acrylic acid compound, and the like) is bonded to a core of a polymer consisting of a rubber component. The rubber polymers exemplified above are all preferable when the (A) thermoplastic resin contains the aromatic polycarbonate ((A1) component). In particular, the polymers except the SB polymer can be suitably used from the viewpoint of good miscibility. Further, when the styrene-based resin of the (A2) component contains polyphenylene ether ((A3) component), the SB polymer is more suitable. Other examples of the rubber polymer include various thermoplastic elastomers such as a styrene-based thermoplastic elastomer, an olefin-based thermoplastic elastomer, a polyurethane-based thermoplastic elastomer, a polyester-based thermoplastic elastomer, and a polyamide-based thermoplastic elastomer.

In addition, the reinforced flame retardant resin composition of the present embodiments may be also blended with one or more of a heat stabilizer, an antioxidant, an ultraviolet absorber, a mold release agent, an antistatic agent, a foaming agent, a dye pigment, and the like. Examples of the heat stabilizers include phosphorus-based heat stabilizers, such as phosphorous acid, phosphoric acid, phosphonous acid, phosphonic acid, and esters thereof. Specific examples include: phosphorous acid ester compounds such as triphenyl phosphite, tris nonyl phenyl phosphite, tris(2,4-di-tert-butyl phenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis (4,6-di-tert-butylphenyl)octyl phosphite, and bis (nonylphenyl) pentaerythritol diphosphite; and phosphoric acid ester compounds such as tributyl phosphate, trimethyl phosphate, tricresyl phosphate, triphenyl phosphate, trichloro-phenyl phosphate, triethyl phosphate, diphenyl cresyl phosphate, diphenyl monoorthoxenyl phosphate, tributoxyethyl phosphate, dibutyl phosphate, dioctyl phosphate, diisopropyl phosphate. Further, examples of other phosphorus-based heat stabilizers include: phosphonous acid ester compounds such as tetrakis(2,4-di-tert-butylphenyl)-4,4'-biphenylene-diphosphonite, tetrakis(2,4-di-tert-butylphenyl)-4,3'-biphenylene-diphosphonite, tetrakis(2,4-di-tert-butylphenyl)-3,3'-biphenylene-diphosphonite, and bis(2,4-di-tert-butylphenyl)-4-biphenylene-diphosphonite. Of these, tris nonylphenyl phosphite, distearyl pentaerythritol diphosphite, bis(2,4-di-tert-butylphenyl)pentaerythritol diphosphite, tris(2,4-di-tert-butylphenyl)phosphite, triphenyl phosphate, trimethyl phosphate, tetrakis(2,4-di-tert-butylphenyl)-4,4'-biphenylene-diphosphonite, and bis(2,4-di-tert-butylphenyl)-4-biphenylene-phosphonite are preferable. These heat stabilizers may be used independently or may be used in combination of two or more types. The content of the heat stabilizer is preferably 0.0001 to 1 parts by mass, more preferably 0.0005 to 0.5 parts by mass, and even more preferably 0.002 to 0.3 part by mass with respect to 100 parts by mass of the combination of the (A) component, the (B) component, the (C) component, and the (D) component.

Examples of the antioxidants include pentaerythritol tetrakis(3-mercaptopropionate), pentaerythritol tetrakis(3-laurylthiopropionate), glycerol-3-stearyl thiopropionate, triethylene glycol-bis[3-(3-tert-butyl-5-methyl-4-hydroxyphenyl) propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3, 5-di-tert-butyl-4-hydroxyphenyl)propionate, 1,3,5-trimethyl-2,4,6-tris(3,5-di-tert-butyl-4-hydroxybenzyl) benzene, N,N-hexamethylenebis(3,5-di-tert-butyl-4-hydroxy-hydrocinnamide), 3,5-di-tert-butyl-4-hydroxybenzylphosphonate-diethyl ester, tris(3,5-di-tert-butyl-4-hydroxybenzyl)isocyanurate, 4,4'-biphenylene diphosphophine acid tetrakis(2,4-di-tert-butylphenyl), 3,9-bis{1,1-dimethyl-[β-(3-tert-butyl-4-hydroxy-5-methylphenyl)pro-pionyloxy]ethyl}-2,4,8,10-tetraoxaspiro(5,5)undecane, and the like. The content of the antioxidant is preferably 0.0001 to 0.05 parts by mass with respect to 100 parts by mass of the combination of the (A) component, the (B) component, the (C) component, and the (D) component.

Examples of the ultraviolet absorbers include: benzophenone-based ultraviolet absorbers represented by 2,2'-dihydroxy-4-methoxybenzophenone; and benzotriazole-based ultraviolet absorbers represented by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazole-2-yl)phenol, 2-[2-hydroxy-3,5-bis(α, α-dimethylbenzyl)phenyl]-2H-benzotriazole, and 2-(3,5-di-tert-amyl-2-hydroxyphenyl) benzotriazole. Further, it is also possible to use hindered amine-based light stabilizers represented by bis(2,2,6,6-tetramethyl-4-piperidyl)sebacate, bis (1,2,2,6,6-pentamethyl-4-piperidyl)sebacate, and the like. The content of the ultraviolet absorber and the light stabilizer each is preferably 0.01 to 5 parts by mass with respect to 100 parts by mass of the combination of the (A) component, the (B) component, the (C) component, and the (D) component.

Examples of the mold release agents include olefin-based wax, silicone oil, organopolysiloxane, paraffin wax, beeswax, and the like. The content of the mold release agent is preferably 0.01 to 1 parts by mass with respect to 100 parts by mass of the combination of the (A) component, the (B) component, the (C) component, and the (D) component.

Examples of the antistatic agents include polyetheresteramide, glycerin monostearate, dodecylbenzenesulfonic acid sodium salt, dodecylbenzenesulfonic acid lithium salt, dodecylbenzenesulfonic acid ammonium salt, dodecylbenzenesulfonic acid phosphonium salt, maleic anhydride monoglyceride, maleic anhydride diglyceride, and the like. The content of the antistatic agent is preferably 0.5 to 20 parts by mass with respect to 100 parts by mass of the combination of the (A) component, the (B) component, the (C) component, and the (D) component.

[Method of Producing Reinforced Flame Retardant Resin Composition]

The reinforced flame retardant resin composition of the present embodiment may be produced by providing and mixing the above-described components at the same time or in a specific order into a mixer such as a tumbler, a V-blender, Nauta mixer, a Banbury mixer, a kneading roll, an extruder, and the like. In particular, melt-kneading by a twin screw extruder is preferable. Further, in performing melt-kneading, it is preferable that the (C) component and the (D) component be supplied into other melt-mixed components from a second supply port by a side feeder and the like. The reinforced flame retardant resin compositions of the present embodiments may contain a recycled material (a pellet of a previously produced resin composition, debris of a previously molded article, and the like, for example) in raw materials thereof. A blending proportion of the recycled material is selected from a range of 0 to 40% by mass, preferably of 2 to 25% by mass, more preferably of 5 to 15% by mass, and even more preferably of 5 to 10% by mass. In the reinforced flame retardant resin composition of the present embodiment, a blending proportion of the recycled material is preferably 40% by mass or less from the viewpoint of preventing a decrease in physical properties.

[Molded Article of Reinforced Flame Retardant Resin Composition]

The reinforced flame retardant resin composition of the present embodiment may be easily formed by any methods, examples of which are known, such as injection molding, extrusion molding, compression molding, rotational molding, and the like. In particular, injection molding enables molding a highly accurate chassis for high precision equipment and the like. In doing so, in order to obtain even higher dimensional accuracy, it is possible to combine injection compression molding, molding with an insulated mold, and the like. It is further possible to combine gas-assisted molding in order to reduce weight and distortion.

The reinforced flame retardant resin compositions of the present embodiments may contain a rework material (debris of a previously molded article and the like, for example). The blending proportion of the rework material is selected from a range of 0 to 40% by mass, preferably of 2 to 25% by mass, more preferably of 5 to 15% by mass, and even more preferably of 5 to 10% by mass. The blending amount of the rework material is preferably 40% or less by mass from the viewpoint of obtaining desirable physical properties in a molded article of the reinforced resin compositions of the present embodiments.

[Use]

The reinforced flame retardant resin compositions of the present embodiments may be required to have high rigidity, high strength, high dimensional accuracy, and high flame retardancy. The reinforced flame retardant resin compositions of the present embodiments may suitably be used for a chassis of OA related equipment in particular. Examples of OA related equipment include printers (especially of a type using a laser beam), copiers, fax machines, projectors, and the like. In addition, the reinforced flame retardant resin compositions of the present embodiment may be used, for example, for a chassis of a home-use robot equipped with a precision sensor, and the like. The reinforced flame retardant resin compositions of the present embodiments are particularly suitable as a material for a molded chassis of a device having an optical system unit. Herein, "optical system unit" means an optical component incorporating optical adjustment components, such as a lens, a prism, a reflector, a diffraction grating, and the like. The optical system unit can be used as: a mechanical component for office equipment such as a projector, a copier, a laser beam printer, and the like; household appliances; precision electronic equipment, and the like. The resin composition used for a molded article (various chassis and the like, for example) for an apparatus having such an optical system unit may be required to have high dimensional stability and little thermal deformation during use (high heat resistance, high rigidity, and high strength). In addition, good flame retardancy may be required in many cases. In consideration of such properties, first, in order to impart desirable heat resistance, it is preferable to use a resin with relatively higher heat resistance, such as a polyphenylene ether-based resin and a polycarbonate-based resin, as the (A) component. In order to impart high strength, high rigidity, and high dimensional stability, mica powder may be used as the (C) component. Further, by also using together with a filler, such as chlorite, having a dehydration starting temperature of the crystallization water in a range of 400 to 600° C. as the (D) component, it is possible to improve flame retardancy. Furthermore, by using an aromatic phosphoric acid ester-based flame retardant agent of the (B) component along with the (D) component, it is possible to even further improve flame retardancy (shorter combustion time, anti-dripping property, for example). By blending such ingredient components, a resin composition having a good balance of the above-described various physical properties is obtained. In particular, the resin composition becomes especially suitable as a material for a molded chassis of a device having an optical system unit.

EXAMPLES

Hereinafter, the present invention is further described in detail with reference to examples and comparative examples. The present invention is, however, not limited to the following examples. A method of measuring physical properties and raw materials used in the examples and the comparative examples are described below.

[Method of Measuring Physical Properties]

Test pieces used for a measurement of physical properties were prepared by drying extruded pellets of resin compositions produced in the examples and the comparative examples described below in a hot air drier for 2 to 3 hours at 90° C. and then by processing them by an injection molding machine (IS-80EPN, manufactured by Toshiba Machine) under conditions in which a cylinder temperature is 290° C. and a mold temperature is 80° C.

(1. Deflection Temperature Under Load (HDT))

In accordance with ASTM D648, a measurement with a load of 18.6 $kg/cm^2$ was performed using test pieces having a thickness of 0.64 cm prepared from resin compositions obtained in Examples 1 to 10 and Comparative Examples 1 to 8 below.

(2. Flexural Strength and Flexural Modulus)

In accordance with ASTM D790, a measurement at a temperature of 23° C. was performed using test pieces having a thickness of 0.64 cm prepared from the resin compositions obtained in Examples 1 to 10 and Comparative Examples 1 to 8 below.

(3. Flame Retardancy)

In accordance with the UL 94V standard, a combustion test was performed using test pieces having a thickness of 1.5 mm prepared from the resin compositions obtained in Examples 1 to 10 and Comparative Examples 1 to 8 below.

(4. Mold Shrinkage Rate)

Test pieces having a width of 50 mm, a length of 100 mm, and a thickness of 4 mm were prepared from the resin compositions obtained in Examples 1 to 10 and Comparative Examples 1 to 8 below and then left in an atmosphere with RH 50% for 24 hours at 23° C. Thereafter, a measurement was performed on the test pieces using a three-dimensional measuring machine (manufactured by Mitutoyo) to calculate the mold shrinkage rate in two directions: the flow direction of the resin composition and the direction perpendicular to the flow direction.

[Raw Materials]

<Thermoplastic Resin (A)>

(A1 Component: Aromatic Polycarbonate)

PC resin: aromatic polycarbonate resin [PANLITE L-1225Y (product name, registered trademark) manufactured by Teijin Chemicals Ltd.].

(A2 Component: Styrene-Based Resin)

AS resin: acrylonitrile-styrene copolymer [HF5670 (product name, registered trademark) manufactured by Cheil Industries, Inc., the content of acrylonitrile being 28.5% by mass and the content of styrene being 71.5% by mass]

(A2 Component: Styrene-Based Resin)

PS resin: high impact polystyrene [PS6200 (product name, registered trademark) manufactured by U.S. Nova Chemicals Co.]

(A3 Component: Polyphenylene Ether)

PPE resin: polyphenylene ether [PP0803 (product name, registered trademark) manufactured by SABIC Innovative Plastics]

<Aromatic Phosphoric Acid Ester-based flame Retardant Agent (B)>

FR-1: resorcinol bis(dixylenylphosphate) [ADK STAB FP-500 (product name, registered trademark) manufactured by ADEKA, TGA 5% mass loss temperature: 351.0° C.]

FR-2: phosphoric acid ester mainly including bisphenol A bis(diphenyl phosphate [CR-741 (product name, registered trademark) manufactured by Daihachi Chemical Co., TGA 5% mass loss temperature: 335.9° C.]

<Mica Powder (C)>

Mica 1: muscovite mica [A-41 (product name, registered trademark) manufactured by Yamaguchi Mica Co., Ltd., average particle diameter: 49 μm]

Mica 2: muscovite mica [B-82 (product name, registered trademark) manufactured by Yamaguchi Mica Co., Ltd., average particle diameter: 173 μm]

<Hydrous Mineral Powder (D)>

Chlorite 1: chlorite having a structural formula represented by $5MgO.Al_2O_3.3SiO_2.4H_2O$ and having an average particle diameter of 13 μm [WL-13L (product name, registered trademark) manufactured by Fuji Talc Industry Co., Ltd., dehydration starting temperature: 520° C.]

Chlorite 2: chlorite having a structural formula represented by $5MgO.Al_2O_3.3SiO_2.4H_2O$ and having an average particle diameter of 5μm [WL-13J (product name, registered trademark) manufactured by Fuji Talc Industrial co., Ltd., dehydration starting temperature: 520° C.]

Boehmite (Alumina Hydrate): boehmite having a structural formula represented by $Al_2O_3.H_2O$ and having an average particle diameter of 0.1 μm [BOEHMITE C01 (product name, registered trademark) manufactured by Taimei Chemicals Co., Ltd., dehydration starting temperature: 500° C.]

<Fluorine-containing Dripping Preventing Agent (E)>

PTFE: polytetrafluoroethylene [POLYFLON MPA FA500 (product name, registered trademark) manufactured by Daikin Industries, Ltd.]

<Other Materials>

Talc 1: talc having an average particle diameter of 15 μm [VICTORILIGHT SG-A (product name, registered trademark) manufactured by Shoukouzan Kougyousho Co., Ltd., dehydration starting temperature: 950° C.]

Talc 2: talc having an average particle diameter of 8 μm [VICTORILIGHT R (product name, registered trademark) manufactured by Shoukouzan Kougyousho Co., Ltd., dehydration starting temperature: about 950° C.]

Magnesium hydroxide: magnesium hydroxide having an average particle diameter of 1 μm [KISUMA 5E (product name, registered trademark) manufactured by Kyowa Chemical Industry Co., Ltd., dehydration starting temperature: about 360° C.]

Wollastonite: wollastonite having an average fiber diameter of 1.7 μm [PH-450 (product name, registered trademark) manufactured by Kawatetsu Mining Co., Ltd.]

Example 1

58 parts by mass of the aromatic polycarbonate resin (A1 component), 12 parts by mass of the AS resin (A2 component), 5 parts by mass of the flame retardant agent FR-1 (B component), 15 parts by mass of the mica 1 (C component), and 10 parts by mass of the chlorite 1 (D component) were supplied from a most upstream portion (top feed) of a twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were then melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Example 2

58 parts by mass of the aromatic polycarbonate resin (A1 component), 12 parts by mass of the AS resin (A2 component), and 5 parts by mass of the flame retardant agent FR-1 (B component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany. Thereafter, 15 parts by mass of the mica 2 (C component) and 10 parts by mass of the chlorite 1 (D component) were supplied from a second feeder (side feed) in the middle of melt-kneading in a cylinder of the extruder, and were then melt-kneaded at a cylinder temperature of 320° C., a screw rotation speed of 250 rpm, a vent vacuum degree of 7.998 kPa (60 Ton) so as to obtain a resin composition. The measurement result of physical properties for the obtained resin composition is shown in Table 1 below.

Example 3

58 parts by mass of the aromatic polycarbonate resin (A1 component), 12 parts by mass of the AS resin (A2 component), 5 parts by mass of the flame retardant agent FR-1 (B component), 15 parts by mass of the mica 1 (C component), and 10 parts by mass of chlorite 2 (D component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Example 4

58 parts by mass of the aromatic polycarbonate resin (A1 component), 10 parts by mass of the AS resin (A2 component), 7 parts by mass of the flame retardant agent FR-1 (B component), 15 parts by mass of the mica 1 (C component), 10 parts by mass of the chlorite 1 (D component), and 0.3 part by mass of the PTFE (E component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Example 5

26 parts by mass of the PS resin (A2 component), 37 parts by mass of the polyphenylene ether (A3 component), 7 parts by mass of the flame retardant agent FR-2 (B component), 15 parts by mass of the mica 1 (C component), and 15 parts by mass of the chlorite 1 (D component) were supplied from the most upstream portion (top feed) of the twin screw extruder ZSK25 (having 10 barrels; a screw diameter of 25 mm; L/D=44, and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Example 6

26 parts by mass of the PS resin (A2 component), 37 parts by mass of the polyphenylene ether (A3 component), 7 parts by mass of the flame retardant agent FR-2 (B component), 15 parts by mass of the mica 1 (C component), and 15 parts by mass of chlorite 2 (D component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Torr) so as to obtain a resin composition. The measurement result of physical properties for the obtained resin composition is shown in Table 1 below.

Example 7

26 parts by mass of the PS resin (A2 component), 37 parts by mass of the polyphenylene ether (A3 component), 7 parts by mass of the flame retardant agent FR-2 (B component), 15 parts by mass of the mica 1 (C component), and 15 parts by mass of boehmite (D component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Example 8

20 parts by mass of the PS resin (A2 component), 30 parts by mass of the polyphenylene ether (A3 component), 10 parts by mass of the flame retardant agent FR-2 (B component), 20 parts by mass of the mica 1 (C component), 20 parts by mass of the chlorite 2 (D component), and 0.3 parts by mass of the PTFE (E component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 1 below.

Comparative Example 1

10 parts by mass of the chlorite 1 (D component) in Example 1 was replaced with the talc 1 [VICTORILIGHT SG-A (product name, registered trademark) manufactured by Shoukouzan Kougyousho Co., Ltd] having an average particle diameter of 15 μm. With the other conditions being the same as in Example 1, a resin composition was obtained. The measurement result of physical properties for the obtained resin composition is shown in the Table 2 below.

Comparative Example 2

The content of the AS resin (A2 component) was changed to 10 parts by mass, and the content of the flame retardant agent FR-1 (B component) was changed to 7 parts by mass. With the other conditions being the same as in Example 1, a resin composition was obtained. The measurement result of physical properties for the obtained resin composition is shown in Table 2 below.

Comparative Example 3

The talc 1 in Comparative Example 2 was replaced with the talc 2 [VICTORILIGHT R (product name, registered trademark) manufactured by Shoukouzan Kougyousho Co., Ltd.] having an average particle diameter of 8 μm. With the other conditions being the same as in Comparative Example 2, a resin composition was obtained. The measurement result of physical properties for the obtained resin composition is shown in Table 2 below.

Comparative Example 4

The talc 1 in Comparative Example 2 was replaced with wollastonite [PH-450 (product name, registered trademark) manufactured by Kawatetsu Mining Co., Ltd.] having an average fiber diameter of 1.7 μm. With the other conditions being the same as in Comparative Example 2, a resin composition was obtained. The measurement result of physical properties for the obtained resin composition is shown in Table 2 below.

Comparative Example 5

The chlorite 1 in Example 4 was replaced with the wollastonite [PH-450 (product name, registered trademark) manufactured by Kawatetsu Mining Co., Ltd.] having an average fiber diameter of 1.7 μm. With the other conditions being the same as in Example 4, a resin composition was obtained. The measurement result of physical properties for the obtained resin composition is shown in Table 2 below.

Comparative Example 6

The content of the AS resin (A2 component) was changed from 10 parts in the Comparative Example 5 to 8 parts. Also, the content of the flame retardant agent FR-1 (B component) was changed from 7 parts to 9 parts. With the other conditions being the same as in Comparative Example 5, a resin composition was obtained. The measurement result of physical properties for the obtained resin composition is shown in Table 2 below.

Comparative Example 7

24 parts by mass of the PS resin (A2 component), 37 parts by mass of the polyphenylene ether (A3 component), 9 parts by mass of the flame retardant agent FR-2 (B component), 15 parts by mass of the mica 1 (C component), and 15 parts by mass of the talc 1 [VICTORILIGHT SG-A (product name, registered trademark) manufactured by Shoukouzan Kougyousho Co., Ltd.] having an average particle diameter of 15 μm were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Torr) so as to obtain a resin composition. The measurement result of physical properties for the obtained resin composition is shown in Table 2 below.

Comparative Example 8

The talc 1 in Comparative Example 7 was replaced with the magnesium hydroxide [KISUMA 5E (product name, registered trademark) manufactured by Kyowa Chemical Industry Co., Ltd., dehydration starting temperature: 360° C.] having an average particle diameter of 1 μm. With the other conditions being the same as in Comparative Example 7, a resin composition was obtained. The measurement result of physical properties for the obtained resin composition is shown in Table 2 below.

Example 9

In accordance with materials and blending ratios shown in Table 2 below, a resin composition was obtained. The measurement result of physical properties for the obtained resin composition is shown in Table 2 below.

Example 10

10 parts by mass of the PS resin (A2 component), 30 parts by mass of the polyphenylene ether (A3 component), 10 parts by mass of the flame retardant agent FR-2 (B component), 35 parts by mass of the mica 1 (C component), and 15 parts by mass of the chlorite 2 (D component) were supplied from the most upstream portion (top feed) of the twin screw extruder ZSK25 (having 10 barrels; a screw diameter of 25 mm; L/D=44; and a screw pattern including 2 kneading disc L, 6 kneading disc R, and 2 kneading disc N) manufactured by Werner & Pfleiderer, Germany, and were melt-kneaded at a cylinder temperature of 320° C., a screw rotation speed of 250 rpm, and a vent vacuum degree of 7.998 kPa (60 Ton) so as to obtain a resin composition. The measurement result of physical properties for the obtained resin composition is shown in Table 2 below.

TABLE 1

| (Components) Part by mass | | Example 1 | Ex. 2 | Ex. 3 | Ex. 4 | Ex. 5 | Ex. 6 | Ex. 7 | Ex. 8 |
|---|---|---|---|---|---|---|---|---|---|
| PC (A1 component) | Panlite L-1225Y | 58 | 58 | 58 | 58 | | | | |
| AS (A2 component) | HF5670 | 12 | 12 | 12 | 10 | | | | |
| PS (A2 component) | PS6200 | | | | | 26 | 26 | 26 | 20 |
| PPE (A3 component) | PPO803 | | | | | 37 | 37 | 37 | 30 |
| FR-1 (B component) | ADK STAB FP-500 | 5 | 5 | 5 | 7 | | | | |
| FR-2 (B component) | CR-741 | | | | | 7 | 7 | 7 | 10 |
| Mica 1 (C component) | A-41 (49 μm) | 15 | | 15 | 15 | 15 | 15 | 15 | 20 |
| Mica 2 (C component) | B-82 (173 μm) | | 15 | | | | | | |
| Chlorite 1 (D component) | WL-13L (13 μm) | 10 | 10 | | 10 | 15 | | | |
| Chlorite 2 (D component) | WL-13J (5 μm) | | | 10 | | | 15 | | 20 |
| Boehmite (D component) | C01 (0.1 μm) | | | | | | | 15 | |
| PTFE (E component) | Polyflon MPA FA500 | | | | 0.3 | | | | 0.3 |
| TOTAL | | 100 | 100 | 100 | 100.3 | 100 | 100 | 100 | 100 |
| (Physical Properties) | | | | | | | | | |
| HDT (load: 0.45 MPa) | ° C. | 114 | 116 | 113 | 108 | 125 | 124 | 122 | 110 |
| Flexural Strength | Mpa | 120 | 127 | 118 | 118 | 115 | 115 | 112 | 121 |
| Flexural Modulus | Mpa | 6520 | 6860 | 6440 | 6930 | 6480 | 6440 | 6240 | 7860 |
| Flame Retardant Level (1.5 mmt) | | V-1 | V-1 | V-1 | V-0 | V-1 | V-1 | V-1 | V-0 |
| Mold Shrinkage Rate | Flow Direction % | 0.26 | 0.25 | 0.28 | 0.26 | 0.20 | 0.21 | 0.23 | 0.18 |
| | Perpendicular Direction % | 0.31 | 0.31 | 0.34 | 0.30 | 0.24 | 0.26 | 0.28 | 0.22 |

As shown in Table 1, the (A) component, the (B) component, the (C) component, and the (D) component were blended at a certain ratio in each of Examples 1 to 9 so as to obtain resin compositions. Thereby, a resin composition having an excellent balance of properties including heat resistance (HDT), rigidity (flexural modulus), strength (flexural strength), dimensional accuracy, and flame retardancy. A greater amount of the (D) component was used in Example 9 and a greater amount of the (C) component was used in Example 10 than other examples. Although there was a slight decrease in flexural strength in both the cases, properties sufficient for practical use were obtained.

TABLE 2

| (Components) Part by mass | | Comparative Example 1 | Comp. Ex. 2 | Comp. Ex. 3 | Comp. Ex. 4 | Comp. Ex. 5 | Comp. Ex. 6 | Comp. Ex. 7 | Comp. Ex. 8 | Example 9 | Ex. 10 |
|---|---|---|---|---|---|---|---|---|---|---|---|
| PC (A1 component) | Panlite L-1225Y | 58 | 58 | 58 | 58 | 58 | 58 | | | | |
| AS (A2 component) | HF5670 | 12 | 10 | 10 | 10 | 10 | 8 | | | | |
| PS (A2 component) | PS6200 | | | | | | | 24 | 24 | 20 | 10 |
| PPE (A3 component) | PPO803 | | | | | | | 37 | 37 | 30 | 30 |
| FR-1 (B component) | ADK STAB FP-500 | 5 | 7 | 7 | 7 | 7 | 9 | | | | |
| FR-2 (B component) | CR-741 | | | | | | | 9 | 9 | 10 | 10 |
| Mica 1 (C component) | A-41 (49 μm) | 15 | 15 | 15 | 15 | 15 | 15 | 15 | 15 | 15 | 35 |
| Chlorite 2 (D component) | WL-13J (5 μm) | | | | | | | | | 25 | 15 |
| Talc 1 | Victorilight SG-A (15 μm) | 10 | 10 | | | | 15 | | | | |
| Talc 2 | Victorilight R (8 μm) | | | | 10 | | | | | | |
| Magnesium hydroxide | Kisuma 5E | | | | | 15 | | | | | |

TABLE 2-continued

|  |  | Comparative Example 1 | Comp. Ex. 2 | Comp. Ex. 3 | Comp. Ex. 4 | Comp. Ex. 5 | Comp. Ex. 6 | Comp. Ex. 7 | Comp. Ex. 8 | Example 9 | Ex. 10 |
|---|---|---|---|---|---|---|---|---|---|---|---|
| Wollastonite | PH-450 (Average Fiber Diameter: 1.7 μm) |  |  |  | 10 | 10 | 10 |  |  |  |  |
| PTFE (E component) | Polyflon MPA FA500 |  |  |  |  | 0.3 | 0.3 |  |  |  |  |
|  | TOTAL | 100 | 100 | 100 | 100 | 100.3 | 100.3 | 100 | 100 | 100 | 100 |
| (Physical Properties) |  |  |  |  |  |  |  |  |  |  |  |
| HDT (load: 0.45 MPa) | °C. | 112 | 107 | 105 | 109 | 108 | 101 | 117 | 115 | 106 | 108 |
| Flexural Strength | Mpa | 120 | 112 | 108 | 116 | 118 | 118 | 110 | 101 | 65 | 54 |
| Flexural Modulus | Mpa | 6530 | 6530 | 6240 | 6780 | 6800 | 6820 | 6320 | 5970 | 7480 | 8270 |
| Flame Retardant Level (1.5 mmt) |  | HB | V-2 | V-2 | V-2 | V-1 | V-2 | V-2 | V-2 | V-0 | V-1 |
| Mold Shrinkage Rate | Flow Direction % | 0.27 | 0.26 | 0.28 | 0.26 | 0.26 | 0.27 | 0.21 | 0.25 | 0.18 | 0.16 |
|  | Perpendicular Direction % | 0.32 | 0.31 | 0.35 | 0.31 | 0.30 | 0.33 | 0.28 | 0.33 | 0.25 | 0.22 |

As shown in Table 2, Comparative Examples 1 to 4 are the cases in which inorganic filler components different from the (A) component, the (B) component, the (C) component, and the (D) component were blended to obtain compositions. During a combustion test, combustion dripping (determination: HB) occurred in Comparative Example 1, and melt dripping (determination: V-2) occurred in Comparative Examples 2 to 4, which indicates that these cases did not attain sufficient flame retardant capability. In Comparative Example 5, wollastonite, which is an inorganic filler other than the (D) component, was used. Combustion dripping prevention capability was improved due to the addition of the (E) component; however, the level of flame retardancy was inferior as compared to Example 4 using the (D) component. In Comparative Examples 6 to 8, an inorganic filler other than the (D) component was used, which resulted in an inferior level of flame retardancy in all the Comparative Examples as compared to Examples. In Comparative Example 6, a greater amount of the (B) component was included as compared to Comparative Example 5. Melt-dripping occurred and the level of flame retardancy was decreased.

As it is clear from the above descriptions, the present invention provides a reinforced flame retardant resin composition that exhibits a good balance of properties including, for example, high heat resistance, high rigidity, high strength, high dimensional accuracy, and good flame retardancy.

The reinforced flame retardant resin composition of the present invention has industrial applicability in use, for example, as a chassis for OA equipment such as an optical chassis for a laser beam type printer, which is an optical unit chassis, a structural frame of a laser beam type printer, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A reinforced flame retardant resin composition comprising:
   20 to 87% by mass of an (A) thermoplastic resin;
   3 to 20% by mass of a (B) aromatic phosphoric acid ester-based flame retardant agent;
   5 to 40% by mass of (C) mica powder; and
   0.5 to 30% by mass of (D) chlorite group mineral powder having a dehydration starting temperature for crystallization water in a range of 400 to 600° C.

2. The reinforced flame retardant resin composition according to claim 1 comprising:
   30 to 87% by mass of the (A) component;
   3 to 20% by mass of the (B) component;
   5 to 30% by mass of the (C) component; and
   0.5 to 20% by mass of the (D) component, wherein a total amount of the (C) component and the (D) component is 10 to 50% by mass.

3. The reinforced flame retardant resin composition according to claim 1 further comprising:
   0.01 to 2 parts by mass of an (E) fluorine-containing dripping preventing agent with respect to 100 parts by mass of a combination of the (A) component, the (B) component, the (C) component, and the (D) component.

4. The reinforced flame retardant resin composition according to claim 1, wherein the (C) mica powder has an average particle diameter of 10 to 150 μm.

5. The reinforced flame retardant resin composition according to claim 1, wherein the (D) chlorite group mineral powder having a dehydration starting temperature for crystallization water in a range of 400 to 600° C. has an average particle diameter of 0.01 to 100 μm.

6. The reinforced flame retardant resin composition according to claim 1, wherein the (D) chlorite group mineral powder having a dehydration starting temperature for crystallization water in a range of 400 to 600° C. is chlorite.

7. The reinforced flame retardant resin composition according to claim 1, wherein the (A) component contains 50 to 100% by mass of an (A1) aromatic polycarbonate and 50 to 0% by mass of an (A2) styrene-based resin.

8. The reinforced flame retardant resin composition according to claim 1, wherein the (A) component contains 50 to 100% by mass of an (A3) polyphenylene ether and 50 to 0% by mass of an (A2) styrene-based resin.

9. A molded article molded from the reinforced flame retardant resin composition according to claim 1.

10. A molded chassis molded from the reinforced flame retardant resin composition according to claim 1.

11. The molded chassis according to claim 10 wherein the molded chassis is a molded chassis for a device having an optical system unit.

12. A method of increasing the flame retardance of a resin composition comprising:

combining (D) chlorite group mineral powder having a dehydration starting temperature for crystallization water in a range of 400 to 600° C. with (A) a thermoplastic resin, (B) an aromatic phosphoric acid ester-based flame retardant agent, and (C) mica powder, wherein the flame retardance of the composition of (A), (B), (C), and (D) exhibits a higher flame retardance than a composition of (A), (B), and (C) that excludes (D).

13. The method according to claim 12, wherein the mass ratio of the (D) chlorite group mineral powder to the amount of the (C) mica powder ranges from 1:80 to 6:1.

14. The method according to claim 12, wherein the (C) mica powder and (D) chlorite group mineral powder together comprise less than 60% by mass of the resin composition.

* * * * *